United States Patent
Otala

(10) Patent No.: US 9,830,368 B1
(45) Date of Patent: Nov. 28, 2017

(54) ASYNCHRONOUS PARALLEL PROCESSING OF LOG DATA

(71) Applicant: Glassbeam, Inc., Santa Clara, CA (US)

(72) Inventor: Taneli Ismo Otala, Sunnyvale, CA (US)

(73) Assignee: Glassbeam, Inc., Santa Clara, CA (US)

(*) Notice: Subject to any disclaimer, the term of this patent is extended or adjusted under 35 U.S.C. 154(b) by 363 days.

(21) Appl. No.: 14/818,147

(22) Filed: Aug. 4, 2015

Related U.S. Application Data

(60) Provisional application No. 62/033,564, filed on Aug. 5, 2014.

(51) Int. Cl.
*G06F 17/30* (2006.01)
*G06F 17/27* (2006.01)
*G06F 9/45* (2006.01)

(52) U.S. Cl.
CPC .......... *G06F 17/30563* (2013.01); *G06F 8/41* (2013.01); *G06F 8/4441* (2013.01); *G06F 17/2705* (2013.01); *G06F 17/30185* (2013.01); *G06F 17/30589* (2013.01)

(58) Field of Classification Search
CPC .......... G06F 8/41; G06F 8/443; G06F 8/4441; G06F 17/30563
See application file for complete search history.

(56) References Cited

U.S. PATENT DOCUMENTS

| | | | | |
|---|---|---|---|---|
| 2002/0062373 | A1* | 5/2002 | Skingle | H04L 63/029 709/225 |
| 2007/0260706 | A1* | 11/2007 | Skingle | G06F 17/30938 709/217 |

\* cited by examiner

*Primary Examiner* — William Spieler
(74) *Attorney, Agent, or Firm* — Van Pelt, Yi & James LLP

(57) ABSTRACT

Techniques to process machine generated log data are disclosed. In various embodiments, a parser definition associated with a set of log data is determined. The parser definition is compiled to create an instance of a parser to parse the set of log data. The parser has a hierarchical structure comprising a plurality of hierarchically related nodes, each of at least a subset of said nodes having associated therewith one or more actors each configured to parse data associated with that node. At least a portion of the set of log data is sent to the parser instance prior to compilation of said parser instance being completed. A first node of the parser instance is configured to receive and parse log data associated with the first node even if compilation of the parser definition has not been completed with respect to a second node of said parser instance.

20 Claims, 8 Drawing Sheets

ASYNCHRONOUS PARALLEL PROCESSING OF LOG DATA

CROSS REFERENCE TO OTHER APPLICATIONS

This application claims priority to U.S. Provisional Patent Application No. 62/033,564 entitled ASYNCHRONOUS COMPILER filed Aug. 5, 2014 which is incorporated herein by reference for all purposes.

BACKGROUND OF THE INVENTION

Complex software and products and hardware systems and devices typically generate "logs" of operating data on a regular basis, e.g., hourly, daily, etc., or in the case of streams continuously, in real time. Logs may include machine data generated by an application or the software and/or hardware infrastructure used to run the application. Logs may comprise a record of all the events that happened in an application and/or other system. They typically include unstructured or semi-structured information and often contain common parameters such as a time stamp, a serial number or other identifier, and IP or other address, process identifiers, etc. Logs may be provided in the form of files, streams, bundles, emails, messages, or other forms.

For manufacturers and/or users of a large installed base, it may be difficult to receive, process, store, and make use of log data, e.g., to detect, analyze, and predict bugs or other failures; to analyze performance; etc.

BRIEF DESCRIPTION OF THE DRAWINGS

Various embodiments of the invention are disclosed in the following detailed description and the accompanying drawings.

DETAILED DESCRIPTION

Figure 1:
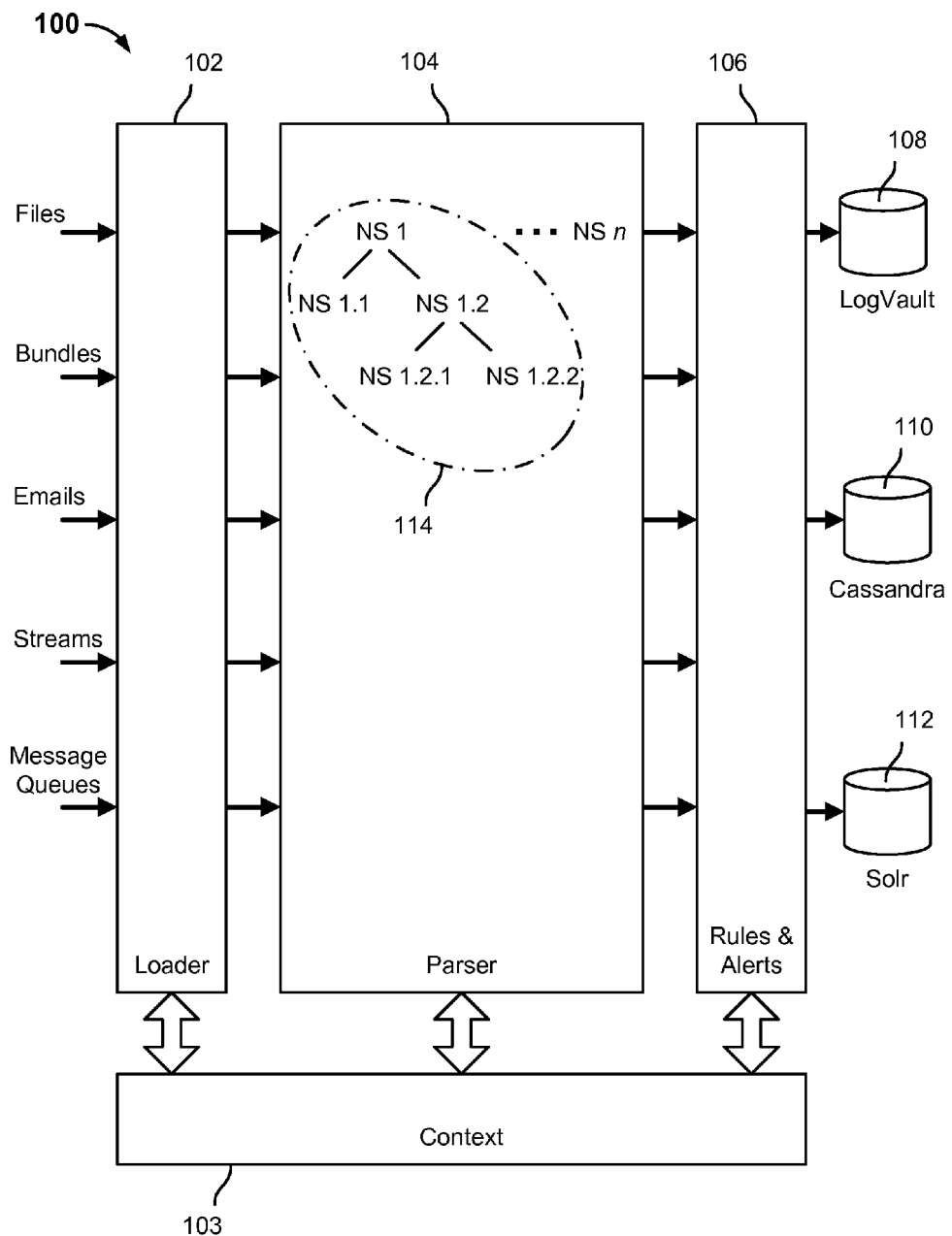
FIG. 1 is a block diagram illustrating an embodiment of a system to process and store log data asynchronously.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to process arbitrary log data asynchronously and in parallel are disclosed. In various embodiments, a framework disclosed herein is used to compile, asynchronously and if needed on demand, domain-specific language-based descriptions of complex log formats and how to parse them to generate compiled parsers that are stored in memory and which use an executable class plus actor structure to parse arbitrary log data asynchronously. In various embodiments, the framework may be implemented as a system, process, and/or embodied in a tangible, non-transitory computer readable storage medium, e.g., as a set of computer instructions to implement the framework.

In some embodiments, SPL (Semiotic Parsing Language), an ETL (Extract Transform Load) language developed by Glassbeam, Inc., may be used to describe complex log formats and how to parse them. In various embodiments, an LCP (Loader/Compiler/Parser) watches inputs (files, streams, emails), chooses a corresponding and/or otherwise suitable SPL (or other parser definition) program, and compiles the SPL into memory. In some embodiments, a context logic and/or module may determine a parser to be used to parse set of log data, e.g., a given file, bundle, stream, etc. The context module may use data included in the log data to determine which parser to use. For example, the context module may extract a sensor address, communication port, or other information from the log data, and map the extracted information to a serial number or other metadata, which in turn may be mapped to a parser definition of a parser to be used to parse the set of log data.

In various embodiments, Functional Programming concepts found in Scala, such as actors, maps, etc., as well as programming concepts such as threads, parallel (SMP) processing and containers, are used to provide and describe an asynchronous compiler as disclosed herein. In various embodiments, software in the Scala programming language running in the Akka framework is used to support a high level of actor-based concurrency. In various embodiments, fault tolerance is provided using this combination, or similar languages and concurrency models in a manner that enables high volumes of log data to be processed with minimal disruption. For example, if a chunk of log data is not able to be processed by a given actor, only that actor is interrupted. The actor may perform exception processing and be reset to be able to resume processing where it left off, all while other actors continue their respective work on other portions of the set of log data.

In some embodiments, a multi-tenant (Log File or Stream) log processing (e.g., LCP) system is provided. In various embodiments, the LCP is able to handle an arbitrary number of parser programs (SPL) and execute them in parallel.

In various embodiments, the LCP receives files, compiles the SPL (or other parser description) on-demand (unless already compiled & cached). In various embodiments, the log data processing system starts to parse the content even before compilation of the parser is complete (in various embodiments by employing a queuing mechanism and message bus, as disclosed herein). The resulting parsed data may be fed, asynchronously, to data stores (e.g., Cassandra, Solr, etc.), in some embodiments via a data abstraction object configured to translate parsed log data into a form required to store the data in the target data store.

FIG. 1 is a block diagram illustrating an embodiment of a system to process and store log data asynchronously. In the example shown, the loader/compiler/parser (LCP) system 100 includes a loader component 102, a context module 103, a parser component 104, a rules and alerts component 106, and a plurality of data stores, including in this example a LogVault data store 108 (e.g., to store raw log data), a Cassandra database 110 (e.g., to store and process parsed log data, such as to facilitate analysis, reporting, etc.), and a Solr data store 112 (e.g., to provide full text search capability).

In various embodiments, each of the loader 102, the parser 104, and the rules/alerts 106 may include a plurality of "actor" entities, each of which is capable of acting independently of and in parallel with other actors comprising the system to load, parse, analyze (e.g. apply rules, generate alerts), and store log data from multiple sources and potentially in diverse forms (e.g., files, streams, etc.) asynchronously and in parallel. In various embodiments, a message bus infrastructure is provided to enable events and other messages to be transmitted between actors comprising the system 100. An actor may have an event or other queue in which log data and/or other data (e.g., messages, events) received via a message bus from other actors may be staged. Each actor may pull data from its queue to be processed.

In some embodiments, data not yet ready to be processed may be left in the queue until the condition(s) required to process the data is/are met. For example, in some embodiments, as described more fully below, parsing of a set of log data (e.g., a file, stream, etc.) may start before the system has finished compiling the parser. For example, a parser may have a hierarchical structure and may comprise one or more actors at each node in the hierarchy. The parser may be able to begin parsing certain log data, associated with nodes for which compilation of the required parsing elements (e.g., actors) has been completed, even while other log data remains held in a queue of the parser, waiting for compilation of parser elements associated with a subtree and/or node with which the other log data is associated to be completed.

In various embodiments, data from numerous and varied sources, and in various forms, may be received concurrently. For example, in the example shown in FIG. 1, log data is shown as being received (potentially) in the form of log files, bundles, emails, data streams, and message queues. In various embodiments, each set of log data is received and processed by one or more actors comprising loader 102. In various embodiments, context module 103 instantiates and/or configures actors comprising loader 102 to refine and/or augment log data by associating context data with received log data. For example, log data may arrive that is identified by a manufacturer's serial number. In some embodiments, the serial number may be used by context 103 to look up other information, such as a manufacturer name, product name, and/or schema (if multiple versions of log data structure may exist for the same product). In some embodiments, a data triplet comprising the manufacturer, product, and schema (M/P/S) may be used to characterize and processing log data. For example, a parser definition to be used to parse the log data may be determined based on the M/P/S determined to be associated with a received set of log data. In some embodiments, the M/P/S triplet may be used as and/or to generate a key to be used to store log data. For example, a Cassandra database has the ability to store large volumes of data quickly, but only supports use of a single key. In some embodiments, the M/P/S triplet or similar data may be used to ensure log data remains segregated in a multi-tenant environment, e.g., one in which multiple different system owners and/or users contract with the same multi-tenant instance of an LCP system such as system 100 of FIG. 1 to process log data from their respective installed product base. In various embodiments, the context 103 may provide the M/P/S or other identifying designation to the loader 102, parser 104, rules and alerts 106, and/or databases such as 108, 110, and 112, to ensure data remains segregated by manufacturer, end user, etc. While in some embodiments an M/P/S triplet may be used to identify and segregate data, e.g., by domain, owner, or otherwise, in various embodiments one or more other sets of data may be used, such as manufacturer/reseller (channel, etc.)/product, etc.

Referring further to FIG. 1, the parser 104 in various embodiments may include one or more instances of each of one or more different hierarchically-structured parsers. In some embodiments, a parser instance is created by compiling a corresponding parser definition that describes the content and structure of a log with which the parser definition is associated and how to parse instances of the log. In some embodiments, each parser may be associated with a top level "namespace" in the hierarchy. The namespace may correspond to and/or be associated with the manufacturer/product/schema triplet described above. In the example shown in FIG. 1, the parser 104 includes n parser instances, represented in FIG. 1 by top level namespaces "NS 1" and "NS n". In the example shown, the top level namespace "NS 1" is associated with a hierarchically structured parser 114, which includes multiple levels of hierarchy, each including zero or more child namespaces. For example, the top level namespace NS 1 includes child namespaces NS 1.1 and NS 1.2, and the latter in turn includes two child namespaces NS 1.2.1 and NS 1.2.2. In some embodiments, namespaces below the top level may correspond to different sections within a set of log data (e.g., a log file).

Each namespace in the hierarchy may be associated with one or more namespace "actors", each of which may be configured to perform such processing tasks as parsing and providing output data based on log data associated with the section (or other portion) with which that namespace is associated, and compiling the definition of the tables and/or child namespaces of that namespace. In some embodiments, each child namespace may represent a sub-section of log data. For example, the parser definition may define one or more tables within a namespace, and for each table may define one or more columns, column operations, other table functions, etc. In some embodiments, a namespace actor may be configured to compile definition statements associated with the namespace, e.g., to generate table structure information (e.g., schema), create table actors to process associated log data, and create child namespaces (if any), including associated actors. In some embodiments, a parser definition may for indicate for each of at least a subset of table elements a corresponding type of parser to be used to parse associated data. For example, if a sub-section of log data with which a table is associated comprises free text, a line-by-line parser may be used. If instead the subsection included XML data, a parser optimized to parse XML may be used. Other examples include parsers optimized to parse name-value pairs, JSON, CSV, or other types of format of log data. In various embodiments, creating an actor may include creating data structures, such a queue in which to stage events or other messages received by the actor, and one or more message buses to be used to send messages to other actors in the system.

In various embodiments, actors are used in loader 102 to receive sets of log data, instantiate parsers, and stream log data (e.g., line by line, in case of log data received other than as a stream) to corresponding parsers.

Figure 2:
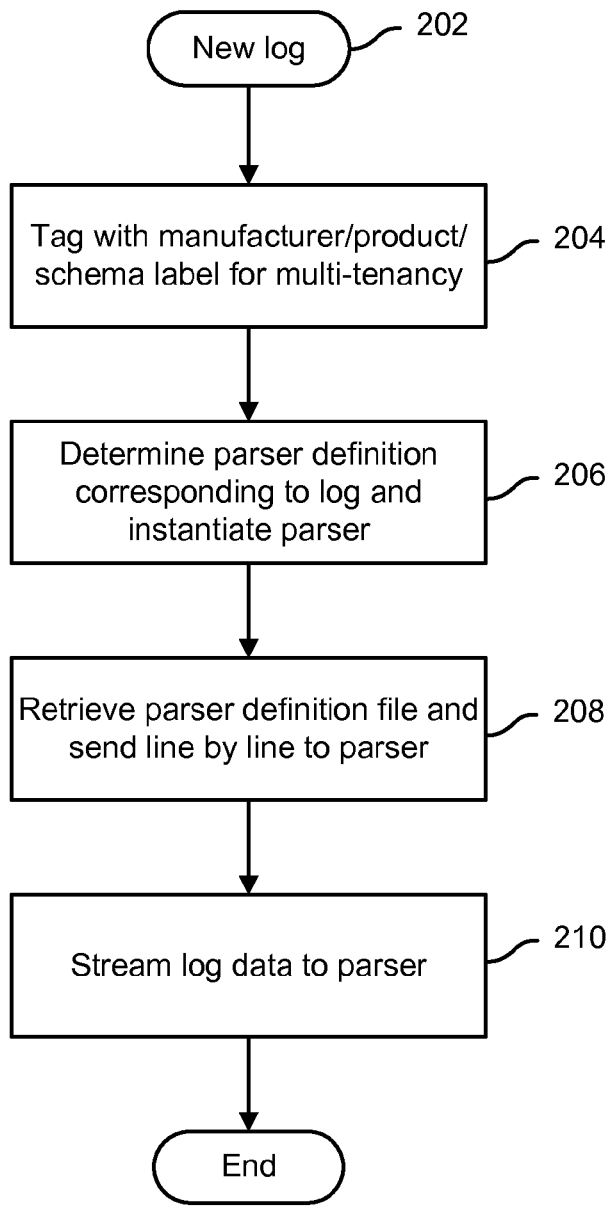
FIG. 2 is a flow chart illustrating an embodiment of a process to receive and process log data.

FIG. 2 is a flow chart illustrating an embodiment of a process to receive and process log data. In various embodiments, the process of FIG. 2 may be performed by one or more actors, e.g., actors comprising a loader component such as loader 102 of FIG. 1. In the example shown, when a new set of log data is received (202), e.g., a new log file, email, bundle, stream, etc., the set of log data is tagged with a manufacturer/product/schema and/or other label (204), e.g., to facilitate data retrieval and analysis (e.g., using M/P/S as a key to store and retrieve data), and to ensure in a multi-tenant environment that the respective data of each tenant is kept separate. In various embodiments, other context data may be generated and associated with the log data. A parser definition corresponding to the received log is determined (206) and an instance of a parser class is instantiated (if needed; in some embodiments a previously-compiled instance of the required parser may be available in a cache and/or an already-running instance of the parser may be selected for use, e.g., by context 103). For example, a parser definition associated with the M/P/S label may be determined, e.g., by context 103 of FIG. 1, and retrieved. The parser definition file is sent line by line to the parser class instance created in the previous step (208). In various embodiments, the parser class instance compiles the parser definition to determine the hierarchical structure of the parser and to create an instance of the hierarchical parser. As noted above, the parser may include one or more namespaces at each of a plurality of levels of the hierarchy. Each namespace may be configured to instantiate its child namespace(s), if any, and tables defined within the namespace. Referring further FIG. 2, even if compilation of the parser definition and instantiation of the parser nodes and elements defined therein are ongoing (208), the loader (i.e., an actor comprising the loader) streams log data to the parser (210). For example, a log file may be streamed line by line to the top level parser comprising the hierarchical parser. If a node with which a given line of log data is associated is not yet (fully) compiled and instantiated, in some embodiments the line remains held in a queue of the top level (or other intermediate) node until the node with which the line is associated is ready to process the line. In various embodiments, multiple independent actors comprising the loader 102 each may perform, asynchronously and in parallel, corresponding instances/iterations of the process of FIG. 2 with respect to corresponding received sets of log data.

Figure 3:
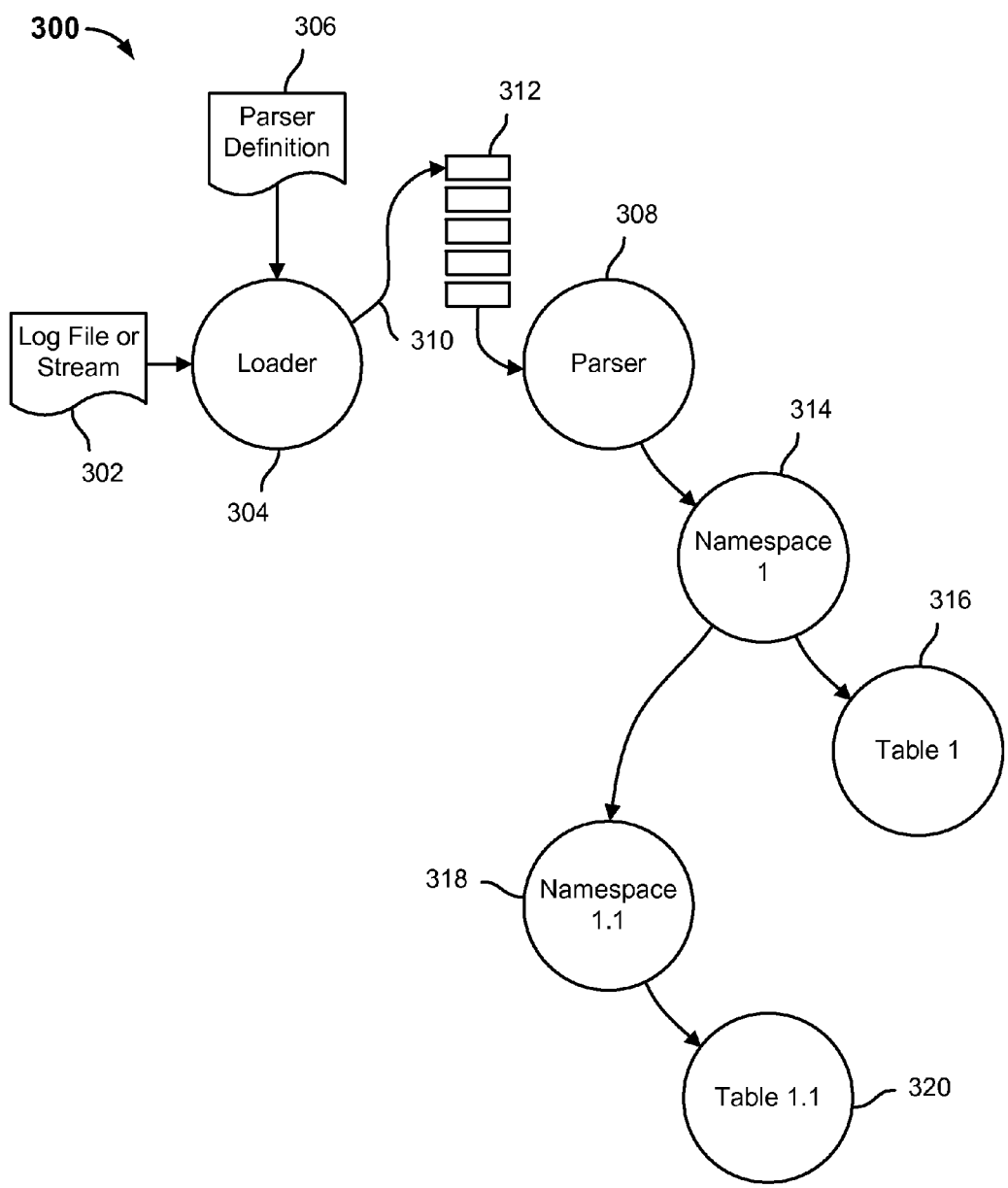
FIG. 3 is a block diagram illustrating an example of parser instantiation and structure in an embodiment of a system to process log data asynchronously.

FIG. 3 is a block diagram illustrating an example of parser instantiation and structure in an embodiment of a system to process log data asynchronously. In the example 300 shown, a log file or stream (etc.) 302 is received by a loader/actor 304. The loader 304 retrieves a corresponding parser definition 306 and instantiates an instance of a parser class, i.e., parser 308. The loader 304 sends the parser definition 306 to parser 308 line by line in a series of messages 310, which are staged in a queue 312. The parser 308 compiles the parser definition 306, including by determining the hierarchical structure of the parser. In the example shown, the structure includes a top level namespace 314 and associated table 316, and a child namespace 318 of namespace 314, as well as a table 320 associated with child namespace 318. In various embodiments, each of namespace 314, table 316, namespace 318, and table 320 comprises an "actor" entity capable of performing tasks asynchronously and independent of and/or in parallel to the work performed by other actors in the system. While in FIG. 3 a queue 312 is shown only for the parser 308, in various embodiments each actor and each node in the hierarchy would have its own queue, as well as access to a message bus via which messages emitted by that actor can be sent to other actors in the system.

Referring to FIG. 3, in various embodiments, while compilation of the parser remains underway, the loader 304 may begin to stream log data, e.g., line by line, to the parser. For example, log data may be sent line by line to the parser 308 via messages 310 sent to parser 308 via queue 312. In various embodiments, if an actor required to process a line of log data is not yet (fully) compiled and instantiated, the log data may remain in queue 312 until the required actor is ready to process it. In some embodiments, other log data may be pulled from queue 312 by parser 308 and sent via the hierarchy (i.e., via any intervening nodes) to the actor with which the data is associated. In this way, processing may be performed asynchronously on log data, potentially in an order that is different than the order in which the data was received. In some embodiments, timestamps may be overwritten, e.g., in the Cassandra or other database in which parsed log data is stored, to reflect the correct order of data within a set of log data.

Figure 4:
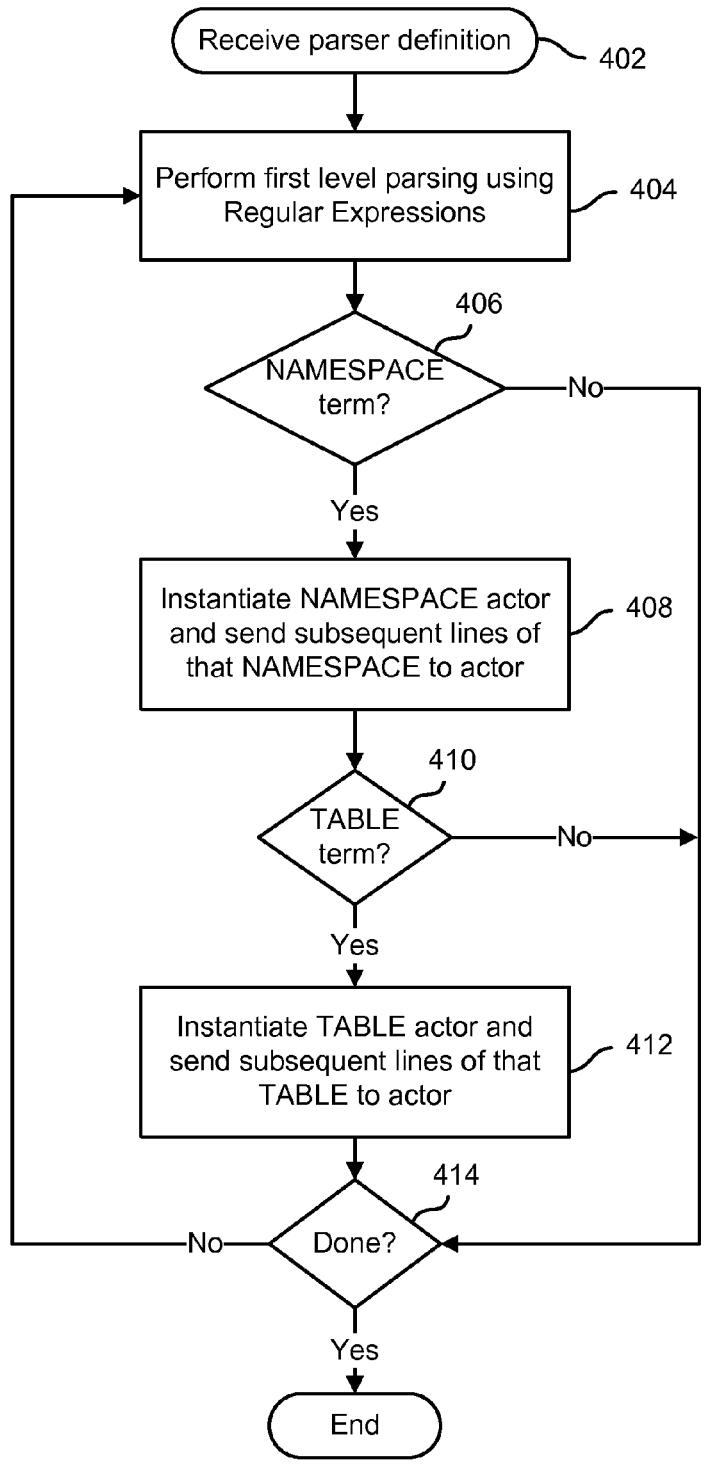
FIG. 4 is a flow chart illustrating an embodiment of a process to instantiate and compile an asynchronously parser.

FIG. 4 is a flow chart illustrating an embodiment of a process to instantiate and compile an asynchronously parser. In various embodiments, the process of FIG. 4 may be performed by a parser and the entities comprising the parser. In the example shown, a parser definition is received (402). For example, an instance of a parser class may receive the definition line by line, e.g., from a loader/actor as described above. In the example shown, first level parsing is performed using regular expressions (404). For example, regular expressions may be used to identify within a parser definition a definition of a namespace and associated elements (e.g., tables). If a parsed portion of the parser definition is determined to define a namespace (406), a corresponding NAMESPACE actor is instantiated, based on that portion of the parser definition, and subsequent lines of the parser definition that are associated with that NAMESPACE are sent to the NAMESPACE actor (408). In various embodiments, the NAMESPACE actor may be configured to process portions of the parser definition that define the NAMESPACE and associated elements (e.g., tables, child namespaces, etc.) If the NAMESPACE actor encounters a table definition (410), the NAMESPACE actor instantiates a TABLE actor and sends subsequent lines associate with the definition of that table to the TABLE actor (e.g., column definitions, column operations, other table functions, etc.) (412). If the NAMESPACE actor encounters a definition of a child namespace, a further iteration of 406 and 408 may be performed. If further table definitions are encounter, further iterations of 410 and 412 may be performed, and so on, recursively, until the entire structure of the hierarchical parser has been determined and instantiated. Once all parts of the parser definition have been processed (414), the process of FIG. 4 ends.

In various embodiments, the use of independent actors to process corresponding portions of a parser definition to compile and instantiate a parser, and to parse associated parts of a log file or other set of log data, enables the system to achieve high throughput, since a high degree of parallelism is possible and each actor performs its work autonomously on an immutable set of data (e.g., event data) staged in its own queue, with the ability to provide output at any time via an event or message sent via a message bus, such that no actor is blocked from performing its work while waiting for another actor to complete a task. In addition, the Scala/Akka framework has low overhead in context switching, enabling a pool of threads to be shared efficiently by many actors.

Figure 5:
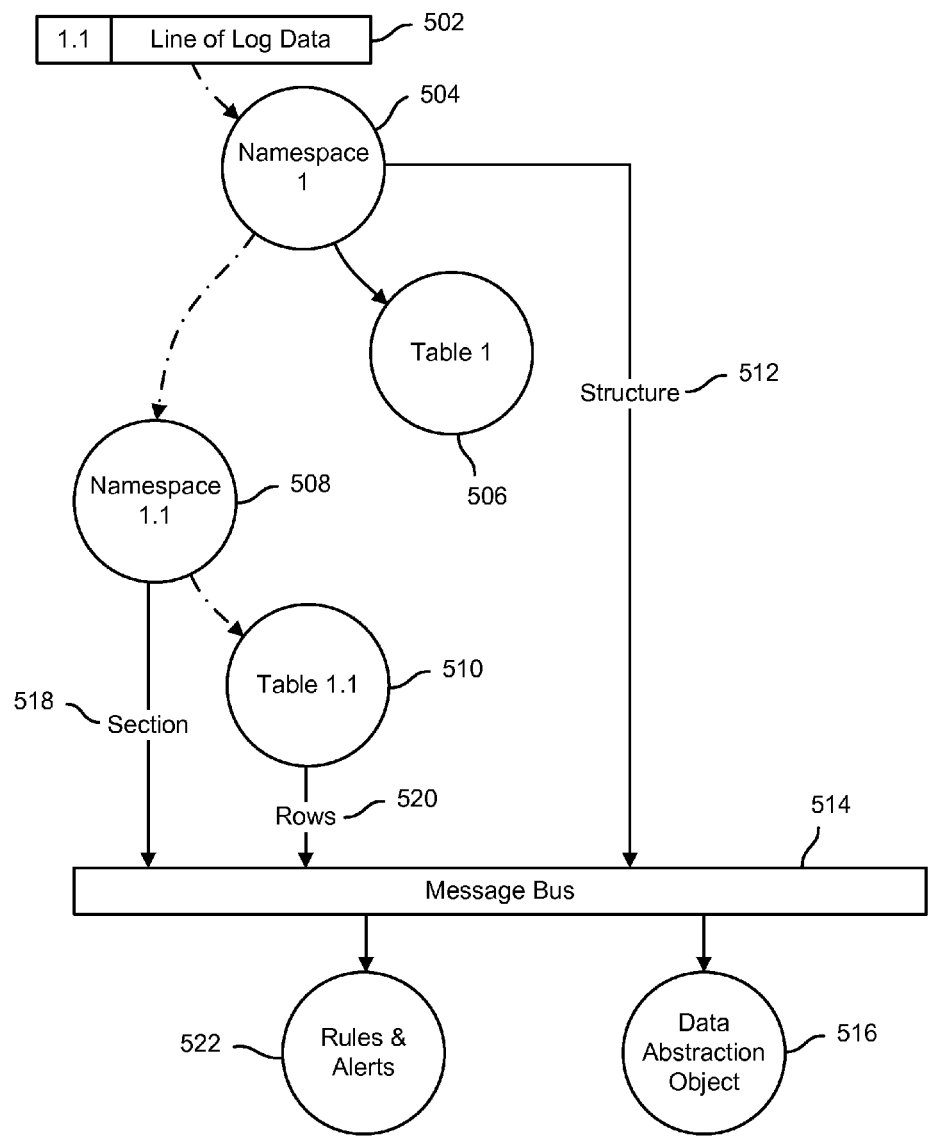
FIG. 5 is a block diagram illustrating an example of a compiled parser in an embodiment of a system to process log data asynchronously.

FIG. 5 is a block diagram illustrating an example of a compiled parser in an embodiment of a system to process log data asynchronously. In various embodiments, the elements shown in FIG. 5 may be implemented in log data processing system, such as system 100 of FIG. 1. In the example shown, a line (or other segment) of log data 502 is shown as having been sent to a hierarchical parser that includes a top level namespace actor 504, which has a table 506 associated with it, and a child namespace 508, which has a table 510 associated with it. The top level namespace 504 has generated, e.g., based on a portion of a parser definition that indicates a hierarchical structure of the parser, a metadata and/or schema that reflects a structure 512 of the parser (504, 506, 508, 510) and consequently, in various embodiments, of the log data (e.g., file or other unit) that the parser is configured to parse.

In some embodiments, the namespace 504 may be configured to parse the structure portion of the parser definition once, but to provide two outputs. For example, in some embodiments, the structure 512 may be provide as a first output in a first form comprising metadata suitable to be stored as a metadata table in a Cassandra database, such as Cassandra database 110 of FIG. 1, and as a second output in a second form comprising a schema to be stored and used by a Solr data store, such as data store 112 of FIG. 1. In this way, the parser definition may be streamed once and output provided in two or more forms, as needed by other actors in the system. In the example shown in FIG. 5, the structure 512 may be communicated by way of one or more events or other messages sent via message bus 514. A data abstraction object 516 may be configured to listen for or otherwise receive the event or other message, and to use the structure 512 so communicated to generate, store, and use a corresponding schema, metadata table, or other data structure to store parsed log data in an appropriately structured way.

In some embodiments, one or more data abstraction objects 516 may be provided for each type of data store used to store log data. Each may be configured to interact with a corresponding type of data store, and to receive and process events/messages that relate to that type of data store. For example, a data abstraction object 516 associated with a Cassandra database may receive and process events/messages in which structure 512 is expressed as metadata suitable to be stored in a metadata table in the Cassandra database, but may ignore events/messages in which structure 512 is expressed as a schema, such as one suitable for use by a Solr data store.

Referring further to FIG. 5, in the example shown the line of log data 502 is shown as being associated with the namespace 508 and associated table 510, as indicated by the "1.1" shown in a header-like area. In some embodiments, the association of log data line 502 with namespace 508 and table 510 may be determined based on one or more of data comprising the line of log data 502 and metadata, such as context data, appended to and/or otherwise associated with the line of log data 502 as it is (or has been) processed by one or more actors comprising the system. For example, namespace 504 may be configured to determine based on data comprising and/or associated with line of log data 502 that the data is associated with namespace 508. The namespace 502 may be configured to associated context or other metadata with the line of log data 502, and to pass the line of log data 502 on to the namespace 508, as indicated in FIG. 5 by the dashed arrow from namespace 504 to namespace 508. In this example, namespace 508 is configured to process the line of log data 502 to generate a "section" event or message 518 and also to recognize that the line of log data 502 is to be passed on to the table 510. The table 510 in this example comprises an actor configured to parse the line of log data 502 to generate and provide as output one or more "row" events/messages 520. In various embodiments, each row event/message may comprise a "row map" that associates each of one or more log data values extracted from the line of log data 502 with a corresponding column identifier.

In various embodiments, data abstraction object 516 may be configured to use one or more of the row event(s)/message(s) 520 and the section event/message 518 to store log data extracted from the line of log data 502. For example, in some embodiments, a data abstraction object 516 associated with a Cassandra database may be configured to use row maps received via row events/messages 520 to store corresponding rows of log data in the database. Similarly, a data abstraction object 516 associated with a Solr data store may be configured to use section data received via section events/messages 518 to store corresponding sections of log data as Solr "documents" in the Solr data store.

The example shown in FIG. 5 further includes a rules and alerts actor 522. In various embodiments, rules and alerts actor 522 may be configured to receive and process log data, e.g., row maps included in row events/messages 520, section data included in section events/message 518, etc. asynchronously and in parallel with other actors in the system. For example, rules may be applied to a row of log data by rules and alerts actor 522 while the same row is being processed by a data abstraction object 516 for storage in a data store.

Figure 6:
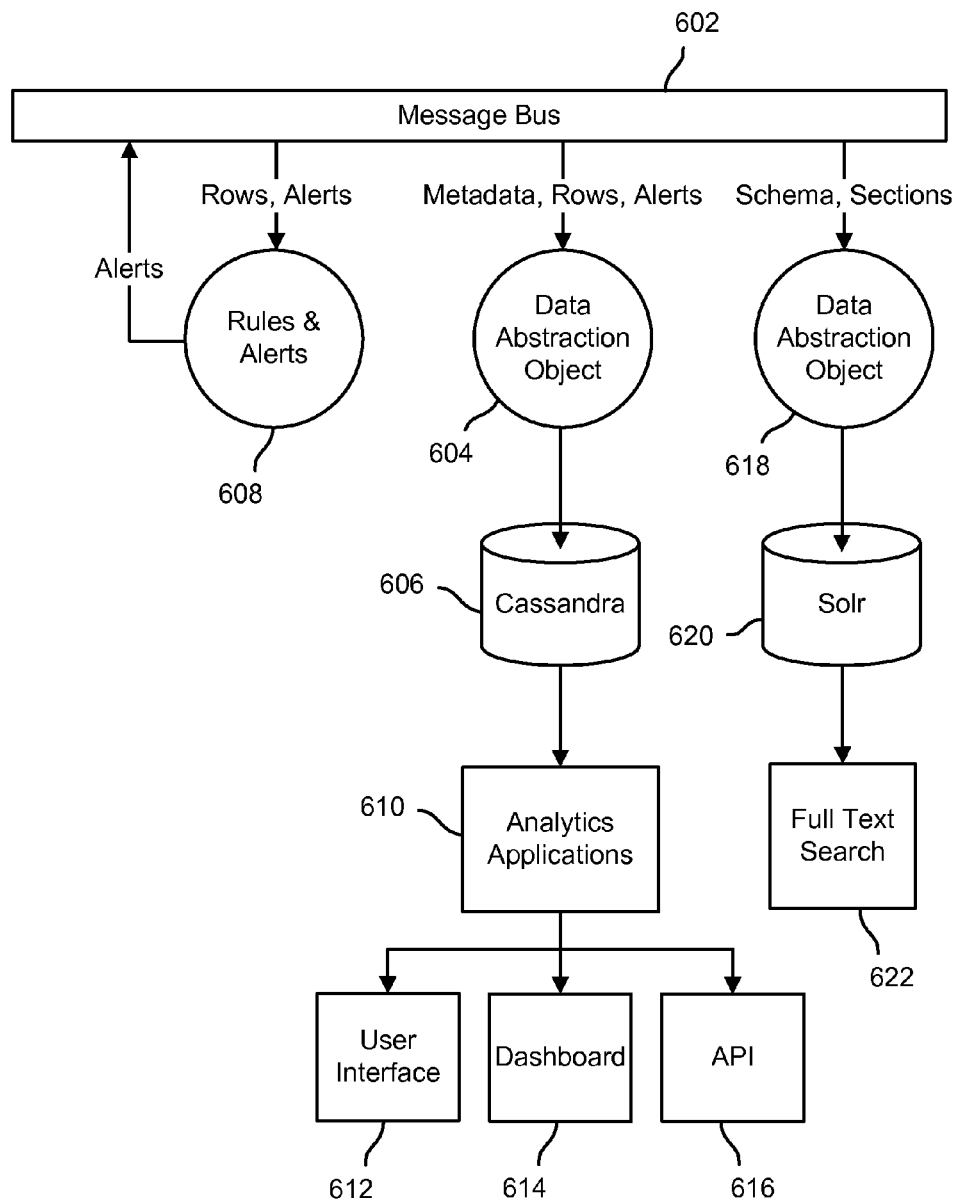
FIG. 6 is a block diagram illustrating an example of use of a message bus and event queues to analyze and store log data asynchronously in an embodiment of a system to process and store log data.

FIG. 6 is a block diagram illustrating an example of use of a message bus and event queues to analyze and store log data asynchronously in an embodiment of a system to process and store log data. In various embodiments, the elements shown in FIG. 6 may be implemented in log data processing system, such as system 100 of FIG. 1. In the example shown, a message bus 602 is provided to enable events and/or other messages to be communicate to, by, and/or among actors comprising a log data processing system. In the example shown, the actors include a data abstraction object 604 associated with a Cassandra database 606. In various embodiments, data abstraction object 604 receives and processes row maps or other representations of parsed log data and uses the received data and metadata (e.g., column names, etc.) to store log data in Cassandra database 606. In the example shown, metadata received via message bus 602 may be used to create and store a metadata table in Cassandra database 606. In addition, alerts generated and sent via message bus 602 by rules and alerts actor 608 may be received by data abstraction object 604 and stored in Cassandra database 606. For example, rules and alerts actor 608 may generate an alert as a responsive action based on a determination by rules and alerts actor 608 that received row data satisfies a rule that requires the alert to be sent. Data abstraction object 604 may be configured to listen for and/or otherwise receive such alerts, and to store corresponding data Cassandra database 606.

While a single rules and alerts actor 608 is shown in FIG. 6, in various embodiments, a separate rules and alerts actor may be instantiated for each instance of each rule. In some embodiments, each instance of a parser may have a corresponding set of rules instantiated for the parser, e.g., by context 103 of FIG. 1. The set of rules may include for each rule in the set a corresponding actor. In some embodiments, a bundle (e.g., comprising a set of relate log files and/or other related log data) may use a shared rule set.

In the example shown, rules and alerts actor 608 also is configured to receive and process its own alert messages and/or alerts propagated by other rules and alerts actors. For example, a more complex rule may be found by rules and alerts actor 608 to be satisfied based on some combination of received row data and received (previously generated) alerts. For example, if three error conditions of a certain type have been detected to have occurred within a prescribed time, a further/different rule may be triggered. In various embodiments, context and/or state information may be maintained and/or used by rules and alerts actor 608 to make such determinations.

Referring further to FIG. 6, data in Cassandra database 606 may be made available to and used by analytics or other applications 610. The functionality and output of such applications may be made available to users via a user interface 612, one or more dashboards 614, and/or API's 616. For example, external applications, services, and/or systems may invoke API 616 to access data in Cassandra database 606 via applications 610.

The example shown in FIG. 6 further includes a second data abstraction layer 618 associated with Solr data store 620. In this example, data abstraction layer 618 receives and processes schema events/messages and/or section events/messages, sent for example by one or more parsers and/or actors comprising parsers, as in the example shown in FIG. 5, and uses such events/messages to store sections of log data, such as discrete sections of a log file, as Solr documents in Solr data store 620. Storing such sections of log data in Solr data store 620 makes a full text search functionality 622 available, in various embodiments.

Figure 7:
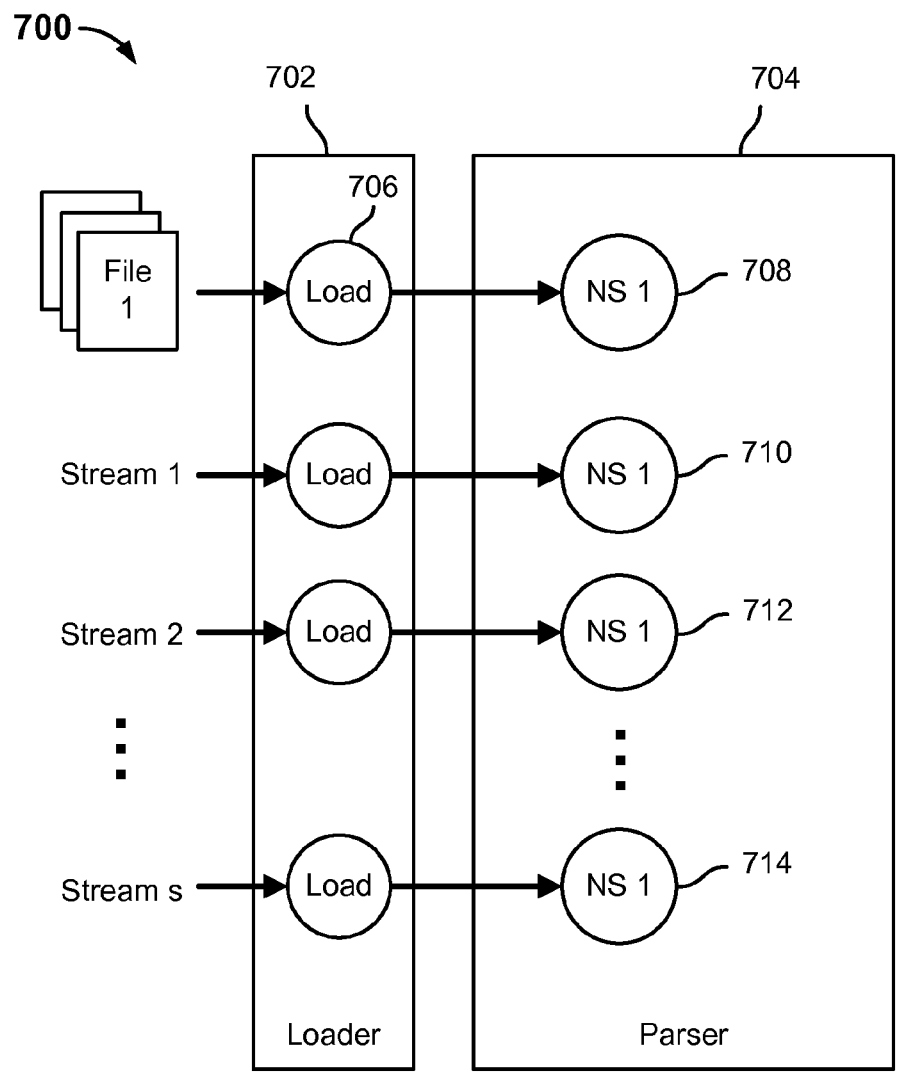
FIG. 7 is a block diagram illustrating an example of using multiple independent actors working in parallel to parse log data in an embodiment of a system to process and store log data.

FIG. 7 is a block diagram illustrating an example of using multiple independent actors working in parallel to parse log data in an embodiment of a system to process and store log data. In various embodiments, the elements shown in FIG. 7 may be implemented in log data processing system, such as system 100 of FIG. 1. In the example shown, the system 700 includes a loader 702 and parser 704. In this examples, a plurality of loaders and parsers are used to receive and process asynchronously and in parallel logs associated with a same namespace and associated parser definition, e.g., a same manufacturer/product/schema, some of which are received in the form of log files and others of which are streamed. In the example shown, a first loader actor 706 is provided to load and process successively received log files, and a separate corresponding loader actor is provided for each of a plurality of streams 1 through s. Each loader has a corresponding dedicated parser (708, 710, 712, 714), each parser being an instance of the same type of parser, i.e., instantiated based on the same parser definition. In some embodiments, the approach illustrated in FIG. 7 may be used at least in part because each stream requires a corresponding stream-specific context data to be maintained, whereas a single parser instance 708 may be used to process successive log files, e.g., by resetting the context data as the end of each file and/or the beginning of the next file is reached.

In various embodiment, all or any part(s) of the examples, entities, and structures shown in FIGS. 3, 5, 6, and 7 may be included in implementations of the system 100 of FIG. 1, in any combination and/or permutation. All such embodiments, and other embodiments described herein, are merely examples of systems to process and store log data or other semi-structured data using multiple actors to process data asynchronously and in parallel, as disclosed herein.

Figure 8:
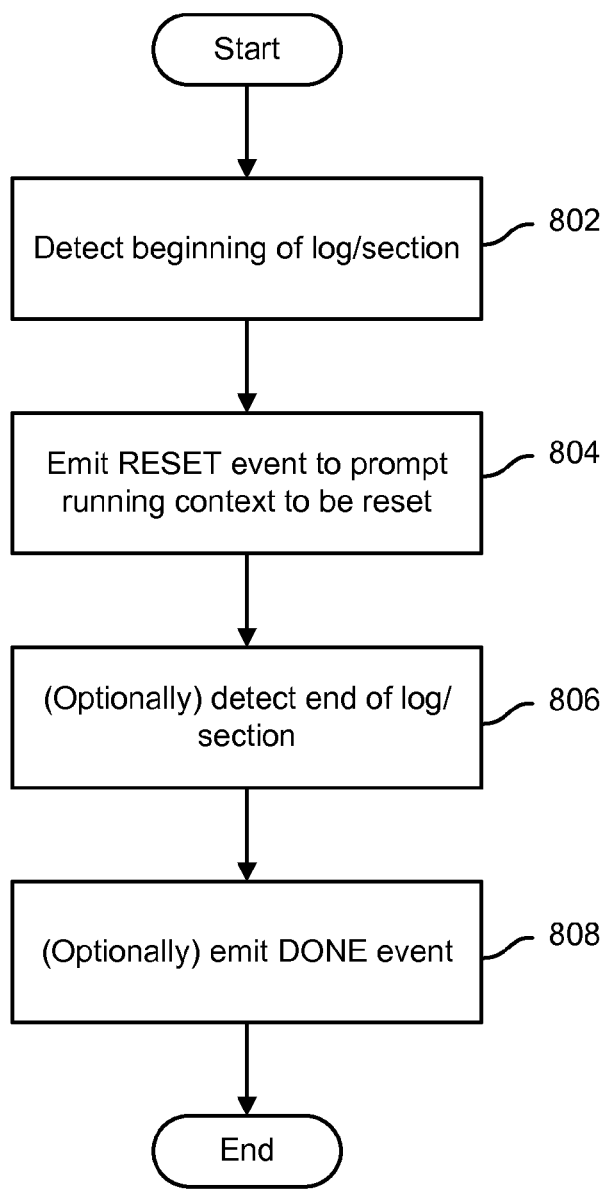
FIG. 8 is a flow chart illustrating an embodiment of a process to mark the beginning and (optionally) the end of a log and/or section thereof.

FIG. 8 is a flow chart illustrating an embodiment of a process to mark the beginning and (optionally) the end of a log and/or section thereof. In various embodiments, the process of FIG. 8 may be performed by a loader, a top level parser, and/or another actor comprising a log data process system, such as system 100 of FIG. 1. In the example shown, the beginning of a log and/or log section is detected (802). For example, a regular expression or other technique may be used to detect log content indicating the beginning of a new log file, segment, section, etc. A "reset" event is emitted (e.g., generated and sent via a message bus) to prompt a running context to be reset (804), e.g., a context or other state information associated with processing of a previous log and/or section. Optionally, an end of a log or section thereof may be detected (806) and (optionally) a "done" or similar event marking the end of a log or section thereof may be emitted (808). In some embodiments, one or more of the following marker messages may be used: start of system; start of file; "begins-with" to indicate the start of a section; "ends-with" to indicate the end of a section; end of file (EOF); beginning and/or end of bundle (or other logical set or unit of log data); and end system.

In various embodiments, parsers and other actors comprising a log data process system, such as system 100 of FIG. 1, may be configured to respond to events generate via a process such as the process of FIG. 8 to reset context or other state information, e.g., in preparation for beginning parsing or other processing of a next log file or other set of log data.

In various embodiments, techniques disclosed herein may be used to "throttle" the streaming of log data into and/or through the log data process system, such as log data processing system 100 of FIG. 1, e.g., to avoid one or more of the excessive use of memory by the memory bus(es) and/or queues, overrunning the ingestion rate of one or more data stores, and overrunning the processing capacity of one or more actors comprising the system. In various embodiments, throttling may be performed as outlined below:
  a. Throttling
    i. It is possible to overrun the ingestion rate of data stores, such as Cassandra or Solr data stores. In various embodiments, end-to-end throttling is perform to control the parsing speed and avoid overrunning the ingestion rate of data stores.
    ii. In various embodiments, throttling establishes a "buffer size of bytes per parser" (characters in some embodiments, instead of bytes) divided into segments.
    iii. At every segment (including initial, pos=0) ingested, a marker message is broadcast into all queues.

iv. The initial (pos=0) marker is collected, to create a set of all materialized routes. Subsequently the count of routes (size of set) is used to determine if ALL routes are done.

v. The purpose of markers, in various embodiments, is to see WHEN for example based on the 10 MB marker, i.e., all data up to the 10 MB marker has been processed. Thus opening the window further, i.e. since the system has fully processed 10 MB, thus 10 MB can be returned to the sliding window size. Meanwhile, in various embodiments, the system uses up to 200 MB (20 segments) to load data further, so in the case of a single Parser—Loader loads up to 200 MB, sending Markers every 10 MB. As soon as the first segment (10 MB) is acknowledged, another 10 MB of buffer space is opened.

In some embodiments, the total window (200 MB) is divided by the number of Parsers simultaneously active, effectively reducing BOTH the total window size and the segment size.

vi. In various embodiments, the Parser is both horizontally and vertically scalable, and as a result the speed of the Parser will always be higher than the worst of Cassandra OR Solr. In such embodiments, throttling may be necessary, otherwise the Parser would run out memory (i.e. consume more memory for queuing than exists).

In various embodiments, a log data processing system such as system 100 of FIG. 1 may be scaled horizontally (by adding nodes to a cluster across which the system is distributed horizontally), vertically (by adding processors to a server or other system on which the system is provide), or a combination of both (i.e., a "hybrid" approach to scaling). In various embodiments, scaling may be provided as summarized below:

b. Scaling
 i. Horizontal
  a) "Many nodes in a cluster"—also called "scale out"
  b) LCP scales horizontally, by adding more nodes and distributing the files. Since every LCP nodes has the same set of SPLs, every node can parse any log file, hence increasing the throughput. Since the Throttling is end-to-end, multiple LCPs do not overwhelm Cassandra/Solr.
 ii. Vertical
  a) "More CPUs per node"—also called "scale up"
  b) Since LCP implements each NAMESPACE & TABLE (& output sink) with Actors, LCP effectively makes use of every thread available. Thus LCP speed can make full use of every Core & Thread available in a system.
 iii. Hybrid
  a) Both Vertical and Horizontal
  b) LCP, using Akka can distribute log files to multiple LCPs in a cluster
  c) LCP's maintain statistics of each other, and in a peer-to-peer manner distribute workload (e.g., files, streams, sections, rules, etc.) to other nodes Using techniques disclosed herein, high volumes of unstructured and semi-structured log data may be received, parsed, stored, and analyzed. In various embodiments, the use of autonomous actors, each operating in a framework that enables inputs to be received, work to be performed, and output to be provided asynchronously by numerous actors working in parallel, ensures that log data is processed, stored, and analyzed quickly and efficiently.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing log data, comprising:
 determining a parser definition associated with a set of log data;
 compiling the parser definition to create an instance of a parser to parse the set of log data, wherein the parser has a hierarchical structure comprising a plurality of hierarchically related nodes, each of at least a subset of said nodes having associated therewith one or more actors each configured to parse data associated with that node; and
 sending at least a portion of the set of log data to the parser instance prior to compilation of said parser instance being completed;
 wherein a first node of said parser instance is configured to receive and parse log data associated with the first node even if compilation of the parser definition has not been completed with respect to a second node of said parser instance.

2. The method of claim 1, further comprising receiving the set of log data.

3. The method of claim 2, wherein the set of log data is received by a loader.

4. The method of claim 3, wherein the loader is configured to determine based at least in part on data included in the set of log data said parser definition associated with the set of log data.

5. The method of claim 3, wherein the loader is configured to retrieve said parser definition associated with the set of log data; create an instance of a parser class; and provide the parser definition to the instance of the parser class.

6. The method of claim 5, wherein the parser definition is streamed line by line to the instance of the parser class.

7. The method of claim 6, wherein portions of the parser definition that have been sent to the instance of the parser class but which have not yet been processed by the instance of the parser class are staged in a queue associated with the instance of the parser class.

8. The method of claim 7, wherein sending at least a portion of the set of log data to the parser instance prior to compilation of said parser instance being completed includes sending to the parser instance a subset of log data that is associated with said second node of the parser instance; wherein the instance of the parser class is configured to leave said subset of log data associated with said second node in the queue until compilation of portions of the parser definition associated with the second node, and any parent nodes of the second node, is completed.

9. The method of claim 1, wherein the hierarchical structure of the parser corresponds to a hierarchical organization of said set of log data.

10. The method of claim 9, wherein each node in the hierarchical structure of the parser is associated with a corresponding section comprising the set of log data.

11. The method of claim 10, wherein each of the respective actors at each of said at least a subset of said nodes comprising the parser is configured to parse the corresponding section of the set of log data that is associated with that node in parallel with the parsing by actors at the other of said at least a subset of said nodes of the respective sections of the set of log data associated with said other nodes.

12. The method of claim 1, wherein each of at least a subset of nodes comprising the parser is configured to parse a corresponding portion of the set of log data, including by extracting from said corresponding portion of the set of log data one or more data values, and generating and providing as output a set of row data that includes the one or more data values and associated each with a corresponding column identifier with which the data value is associated.

13. The method of claim 12, wherein each parser node in the subset is further configured to send the set of row data via a message bus to a remote actor configured to perform further processing with respect to the set of row data.

14. The method of claim 13, wherein the remote actor comprises a data abstraction object configured to store the set of row data in a database.

15. The method of claim 13, wherein the remote actor comprise a rule and alert actor configured to apply a rule to the set of row data and generate an alert if the set of row data is determined to satisfy the rule.

16. A system to process log data, comprising:
a communication interface; and
a processor coupled to the communication interface and configured to:
determine a parser definition associated with a set of log data;
compile the parser definition to create an instance of a parser to parse the set of log data, wherein the parser has a hierarchical structure comprising a plurality of hierarchically related nodes, each of at least a subset of said nodes having associated therewith one or more actors each configured to parse data associated with that node; and
send at least a portion of the set of log data to the parser instance prior to compilation of said parser instance being completed;
wherein a first node of said parser instance is configured to receive and parse log data associated with the first node even if compilation of the parser definition has not been completed with respect to a second node of said parser instance.

17. The system of claim 16, wherein the processor is further configured to determine based at least in part on data included in the set of log data said parser definition associated with the set of log data.

18. The system of claim 17, wherein the processor is further configured to:
retrieve said parser definition associated with the set of log data;
create an instance of a parser class; and
provide the parser definition to the instance of the parser class;
wherein portions of the parser definition that have been sent to the instance of the parser class but which have not yet been processed by the instance of the parser class are staged in a queue associated with the instance of the parser class; and
wherein sending at least a portion of the set of log data to the parser instance prior to compilation of said parser instance being completed includes sending to the parser instance a subset of log data that is associated with said second node of the parser instance; wherein the instance of the parser class is configured to leave said subset of log data associated with said second node in the queue until compilation of portions of the parser definition associated with the second node, and any parent nodes of the second node, is completed.

19. The system of claim 16, wherein the hierarchical structure of the parser corresponds to a hierarchical organization of said set of log data; wherein each node in the hierarchical structure of the parser is associated with a corresponding section comprising the set of log data; and wherein each of the respective actors at each of said at least a subset of said nodes comprising the parser is configured to parse the corresponding section of the set of log data that is associated with that node in parallel with the parsing by actors at the other of said at least a subset of said nodes of the respective sections of the set of log data associated with said other nodes.

20. A computer program product to process log data, the computer program product being embodied in a non-transitory computer readable medium and comprising computer instructions for:
determining a parser definition associated with a set of log data;
compiling the parser definition to create an instance of a parser to parse the set of log data, wherein the parser has a hierarchical structure comprising a plurality of hierarchically related nodes, each of at least a subset of said nodes having associated therewith one or more actors each configured to parse data associated with that node; and
sending at least a portion of the set of log data to the parser instance prior to compilation of said parser instance being completed;
wherein a first node of said parser instance is configured to receive and parse log data associated with the first node even if compilation of the parser definition has not been completed with respect to a second node of said parser instance.

* * * * *